Patented Oct. 26, 1937

2,096,947

UNITED STATES PATENT OFFICE 2,096,947

INSECTICIDAL OIL SPRAY

Vanderveer Voorhees, Hammond, Ind., assignor to Standard Oil Company, Chicago, Ill., a corporation of Indiana No Drawing. Application February 14, 1934, Serial No. 711,226

5 Claims. (Cl. 167—28)

This invention relates to an insecticidal oil spray and it pertains more particularly to a spray which may be safely applied to citrus foliage as well as deciduous foliage for protection against plant parasites such as red spider, scale, codling moth, pear psylla, etc.

The object of the invention is to provide a composition of oil with an oil-soluble emulsifier-insecticide which results in the production of a quick breaking emulsion when the composition is mixed with water, so that when such an emulsion is sprayed onto plant leaves the oil is released and deposited thereon in a thin, continuous film. A more important object of the invention is to provide an oil solute which is non-injurious to plant leaves and which retards or prevents the penetration of oil into the plant leaves. In other words, the object is to provide an oil spray which may be applied directly as an atomized mist, or which may be applied in the form of an aqueous emulsion, but which will in either case give protection against plant parasites without injuring the plant tissues, and particularly without being absorbed therein. The primary object of the invention is therefore to avoid plant injuries due to interference with plant respiration and to metabolic disturbances in the plant caused by the penetration of oil into the tissues, such as the consequent interference with translocation of synthesized starch from the leaf to the other parts of the plant.

In practicing my invention I employ high molecular weight hydroxy hydrocarbons, particularly high molecular weight alcohols, oxidation products of high molecular weight oils and waxes and high molecular weight synthetic oils containing hydroxy groups. Examples of the high molecular weight alcohols are lauryl, cetyl, carnaubyl, myricyl, etc. The oxidation products may be prepared by air oxidation of high molecular weight hydrocarbons such as the paraffin waxes under carefully controlled conditions or by oxidation with oxidizing catalysts or chemicals. The preparation of hydroxy compounds of white oils, paraffin wax and high molecular weight synthetic oils may be accomplished by first halogenating the compounds by chlorination and then replacing the halogen atom in the alkyl halides by a hydroxy group, for instance, by treatment with water or a metallic hydroxide. In all cases I obtain a high molecular weight hydrocarbon which contains upwards of fifteen carbon atoms and which is therefore oil-soluble. This high molecular weight hydrocarbon contains one or more hydroxy groups and it therefore has the effect, when dissolved in oil, of retarding the penetration of that oil into plant leaves. In practicing my invention I dissolve from about $\frac{2}{10}$% to 10% of one or more of these hydroxy high molecular weight hydrocarbons in a spray oil and then apply the oil solution to plant foliage either by means of an atomizing spray or by means of an aqueous emulsion. I prefer to employ hydroxy hydrocarbons which are paraffinic and which will therefore have a minimum tendency to oxidize and/or to cause plant injury.

Since the invention relates primarily to the so-called "summer oils" or oils to be applied to plant leaves, I employ as the main constituent of the spray composition, highly refined oils commonly known as "white oils." These oils are petroleum distillates ranging in viscosity from about 40 to 100 seconds Saybolt at 100° F. and they consist chiefly of paraffinic components, from which the so-called "smoky hydrocarbons," unsaturated hydrocarbons and chemically reactive components have been removed by sulfuric acid treatments or by extraction with suitable solvents, absorbent clay, etc. I will describe the present invention as used with a white oil having a viscosity of about 60 seconds Saybolt at 100° F. and having an unsulfonatable residue of about 95%.

In order to decrease the tendency of the oil to penetrate into and be absorbed by plant leaves I add to it a high molecular weight hydroxy compound, preferably an alcohol having a hydrocarbon radical at least fifteen carbon atoms in length. I dissolve from about $\frac{2}{10}$% to 10%, preferably about 4% of these hydroxy hydrocarbons in the oil and then apply the oil to the plant leaves either by atomizing it into a fine mist or by emulsifying it in aqueous solution. In the latter case it is usually necessary to employ an emulsifying agent and I prefer to employ small amounts of glyceryl oleate and aluminum naphthenate for this purpose, the former having strong emulsifying action, the latter having a tendency to cause invert emulsions or oil deposit on plant leaves and both of them being oil-soluble and well suited for this particular use. I do not limit myself, however, to any particular type of emulsifier or to any particular proportions since my invention is directed to the use of the high molecular weight hydroxy hydrocarbon for changing the surface tension characteristics and the physiological action of the oil on plant leaves.

As hereinabove stated, I prefer to employ higher alcohols having at least fifteen carbon atoms in the hydrocarbon chain, examples of which are lauryl, cetyl, carnaubyl, myricyl, etc. Mixtures of these higher alcohols may be obtained by halogenating paraffin wax introducing one, two or even three halogen atoms and then replacing the halogen atoms in the alkyl halides by hydroxy radicals. This method of procedure may also be employed for synthetic oils of high molecular weight as well as for paraffin waxes. An example of such synthetic oils is described in British Patent No. 355,214; olefins and/or unsaturated hydrocarbons are polymerized with aluminum chloride to yield high molecular weight synthetic oils which are quite paraffinic in their physical and chemical characteristics. Such synthetic oils may be halogenated and converted into alcohols in the same manner as paraffin waxes hereinbove described.

I may also catalytically reduce the fatty acids such as palmitic, oleic or stearic to alcohols by methods known to the art, and employ these materials in the same manner. In general I find that the alcohols of higher molecular weight are more effective in preventing absorption of oil than are the lower ones.

I claim:

1. An insecticidal oil spray which comprises a petroleum oil having a viscosity of about 40 to 100 seconds Saybolt at 100° F. in combination with about $\frac{2}{10}$% to 10% of a high molecular weight alcohol containing at least 12 carbon atoms.

2. An insecticidal oil spray which comprises a petroleum oil having a viscosity of about 40 to 100 seconds Saybolt at 100° F. in combination with about $\frac{2}{10}$% to 10% of cetyl alcohol.

3. An insecticidal petroleum oil having a viscosity of about 40 to 100 seconds Saybolt at 100° F. in combination with about $\frac{2}{10}$% to 10% of lauryl alcohol.

4. An insecticidal oil spray which comprises a petroleum oil having a viscosity of about 40 to 100 seconds Saybolt at 100° F. in combination with about $\frac{2}{10}$% to 10% of carnaubyl alcohol.

5. An insecticidal oil spray which comprises a petroleum oil having a viscosity of about 40 to 100 seconds Saybolt at 100° F. in combination with about $\frac{2}{10}$% to 10% of a mixture of high molecular weight alcohols containing at least 15 carbon atoms and prepared from paraffin wax.

VANDERVEER VOORHEES.